United States Patent
Maeda et al.

(10) Patent No.: US 6,414,620 B1
(45) Date of Patent: Jul. 2, 2002

(54) SOUND PROCESSING SYSTEM

(75) Inventors: Kengo Maeda, Nara; Tomoyuki Kawai, Yamatokoriyama, both of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/994,650

(22) Filed: Nov. 28, 2001

(30) Foreign Application Priority Data

Nov. 28, 2000 (JP) ........................................ 2000-361980

(51) Int. Cl.⁷ ................................................. H03M 1/12
(52) U.S. Cl. ........................................ 341/155; 395/309
(58) Field of Search ............................... 341/155, 144, 341/145, 156; 348/14, 15; 364/228.4, 228.5, 228.6

(56) References Cited

U.S. PATENT DOCUMENTS

| | | | | |
|---|---|---|---|---|
| 5,797,028 A | * | 8/1998 | Gulick et al. | 395/800.32 |
| 5,839,108 A | * | 11/1998 | Daberko et al. | 704/270 |
| 5,890,115 A | * | 3/1999 | Cole | 704/258 |
| 5,982,459 A | * | 11/1999 | Fandrianto et al. | 348/845.2 |
| 6,121,998 A | * | 9/2000 | Voois et al. | 348/14 |
| 6,124,882 A | * | 9/2000 | Voois et al. | 348/15 |

FOREIGN PATENT DOCUMENTS

| | | |
|---|---|---|
| JP | 10-282987 | 10/1998 |
| JP | A11-345194 | 12/1999 |

* cited by examiner

*Primary Examiner*—Brian Young
*Assistant Examiner*—John Nguyen

(57) ABSTRACT

A signal processing system includes an A/D conversion section for converting an analog signal into a digital signal; a digital signal processing section for processing the digital signal; a D/A conversion section for converting the digital signal into an analog signal; a control section; and a memory section including a first program memory area for storing a program for processing the digital signal and a first data memory area. The digital signal processing section includes a second program memory area connected, via a first bus, to the first program memory area, and a second data memory area connected to the first data memory area via a second bus.

11 Claims, 8 Drawing Sheets

SOUND PROCESSING SYSTEM

BACKGROUND OF THE INVENTION

1. Field of the Invention

The present invention relates to a signal processing system, and in particular, to a signal processing system having a voice processing function such as, for example, a voice recognition function or a voice synthesis function, which is required to be performed in real-time in mobile electronic devices including cellular phones.

2. Description of the Related Art

FIG. 6 is a block diagram illustrating a conventional voice processing system 600.

The voice processing system 600 includes a CODEC 601, a DSP (digital signal processor) 602, non-volatile MROMs (mask ROMs) 603 and 606, a synchronous DRAM 604, and a microprocessor (CPU) 605. The DSP 602 is connected to the non-volatile MROM 606, the synchronous DRAM 604, and the microprocessor 605 via a bus 607.

The CODEC 601 includes an A/D converter for converting an analog voice signal input from an external device into a digital signal, and a D/A converter for converting a digital signal obtained by processing performed in the voice processing system 600 into an analog signal. The DSP 602 processes the digital signal obtained by the A/D converter in the CODEC 601. The non-volatile MROM 603 stores an acoustic model used for extracting a feature amount of the input analog voice signal. The non-volatile MROM 606 stores, for example, a voice recognition program, a voice synthesis program, and dictionary data, which are required for processing performed by the DSP 602. The synchronous DRAM 604 is a volatile memory for temporarily storing data processed by the DSP 602. The microprocessor 605 transfers the programs stored in the non-volatile MROM 606 to the DSP 602 and controls the DSP 602 to execute the programs.

The voice processing system 600 shown in FIG. 6 performs voice recognition as described below in steps S01 through S04.

Step S01: An analog voice signal input from an external device is converted into a digital signal by the A/D converter in the CODEC 601.

Step S02: The microprocessor 605 transfers the voice recognition program stored in the non-volatile MROM 606 to a program memory in the DSP 602. Alternatively, the microprocessor 605 transfers the voice recognition program, the dictionary data and the like stored in the non-volatile MROM 606 to the synchronous DRAM 604 and controls the DSP 602 to directly access the synchronous DRAM 604 and to read the voice recognition program, the dictionary data and the like transferred.

Step S03: The DSP 602 extracts a feature amount of the digital signal obtained in step S01 in accordance with the voice recognition program. For extracting the feature amount, the DSP 602 is controlled by the microprocessor 605 to read the acoustic model from the non-volatile MROM 603 while comparing the digital signal with the acoustic model stored in the non-volatile MROM 603. The obtained feature amount data is temporarily stored in the synchronous DRAM 604 via the bus 607.

Step S04: The DSP 602 identifies input voice from the feature amount data obtained in step S03. The DSP 602 reads the dictionary data stored in the non-volatile MROM 606 (or the dictionary data transferred to the synchronous DRAM 604) via the bus 607. Then, the DSP 602 reads the feature amount data temporarily stored in the synchronous DRAM 604 via the bus 607. The DSP 602 compares the dictionary data with the feature amount data read from the synchronous DRAM 604. The DSP 602 then temporarily stores intermediate data obtained by the comparison in the synchronous DRAM 604 via the bus 607. Since the bus 607 is occupied for storing the intermediate data in the synchronous DRAM 604, the comparison between the dictionary data and the subsequent portion of the feature amount data is interrupted while the intermediate data is being stored in the synchronous DRAM 604. In this manner, the entire feature amount data and the dictionary data are compared, so as to identify the input voice.

The voice processing system 600 performs voice synthesis in a manner similar to voice recognition as described below.

The voice synthesis program stored in the non-volatile MROM 606 is transferred to the program memory in the DSP 602 by an instruction from the microprocessor 605. In accordance with the voice synthesis program, the DSP 602 synthesizes voice from text data to be synthesized, and the D/A converter in the CODEC 601 converts the obtained digital voice signal into an analog signal. The analog signal is output through an external speaker.

The conventional voice processing system 600 shown in FIG. 6 typically uses the non-volatile MROMs 603 and 606 as non-volatile memories. An MROM already has information written therein when being produced, and the information cannot be rewritten by the user. An MROM is used for the reasons that (1) a voice recognition program, a voice synthesis program, dictionary data, an acoustic model and the like which are required for voice recognition or voice synthesis need not be rewritten, and (2) an MROM is inexpensive and cost-effective.

However, in order to improve the voice recognition accuracy, the acoustic model needs to be optimized by rewriting the data. The following two types of voice recognition systems, for example, use a rewritable non-volatile memory.

FIG. 7 is a block diagram illustrating a conventional voice recognition system 700 used for car navigation, which is disclosed in Japanese Laid-Open Publication No. 10-282987.

The voice recognition system 700 includes a microphone 701 for taking in voice, a dictionary switching section 703 for selecting a dictionary or switching one dictionary to another in accordance with dictionary switching information 702, a non-volatile ROM 704 storing a plurality of dictionary data units, a volatile RAM 705 for storing a dictionary data unit transferred from the non-volatile ROM 704, a voice analysis section 706 for performing pre-processing such as, for example, noise processing or voice analysis, a voice recognition section 707 for performing voice recognition, and an acoustic model section 708 storing an acoustic model to be read when the voice recognition section 707 performs voice recognition.

The voice recognition section 707 outputs a voice recognition result by a signal 709, and also feeds the voice recognition result back to the dictionary switching section 703 by a signal 710.

The non-volatile ROM 704 is a rewritable memory such as, for example, a flash memory. The plurality of dictionary data units stored in the non-volatile ROM 704 are transferred to the volatile RAM 705 when necessary. The voice recognition section 707 accesses the volatile RAM 705 storing the dictionary data unit transferred from the non-volatile ROM 704.

The voice processing system 700. stores the dictionary data units in the rewritable non-volatile ROM 704, and therefore improves the voice recognition accuracy in a car navigation system which needs to have a large vocabulary. Since the voice recognition section 707 accesses the volatile RAM 705 storing the dictionary data unit transferred thereto, high-speed data read is realized due to the characteristics of the RAM (random access memory) and thus the response speed of the voice processing system 700 is increased.

FIG. 8 is a block diagram illustrating a conventional voice processing system 800 used in a cellular phone, which is disclosed in Japanese Laid-Open Publication No. 11-345194.

The voice processing system 800 includes a CPU 801 for controlling elements of the voice processing system 800, a DSP 802 including a volatile RAM 803, and a non-volatile ROM 804 storing a voice CODEC, a program and the like. These elements are connected with each other as shown in FIG. 8 via a bus 805.

The non-volatile ROM 804 is a rewritable memory such as, for example, a flash memory. The program stored in the non-volatile ROM 804 is transferred to the volatile RAM 803 in the DSP 802 when necessary. The CPU 801 executes the program transferred to the volatile RAM 803, and thus the DSP 802 performs voice processing.

Since the voice processing system 800 uses the rewritable non-volatile ROM 804, the function performed by the DSP 802 can be changed simply by rewriting the voice processing program stored in the non-volatile ROM 804.

Using a rewritable non-volatile memory in a voice processing system as described above is effective, but is not suitable to certain types of voice processing systems which are required to perform real-time processing. The reason is because a rewritable non-volatile memory such as a flash memory has a disadvantage of the operating speed, especially the writing speed, being slower than that of a volatile memory.

In the voice processing system 700 shown in FIG. 7, in order to overcome the above-described problem, data which needs to be accessed at a high speed is first transferred from the non-volatile ROM 704 to the volatile RAM 705 and then the voice recognition section 707 directly accesses the volatile RAM 705. However, such a method disadvantageously requires complicated control of the voice processing system 700 and increases the number of elements required. The increase in the number of elements tends to prevent reduction in the size and weight of a mobile electronic device including the voice processing system.

In the voice processing system 800 shown in FIG. 8, in order to overcome the above-described problem, necessary programs including the dictionary data and the acoustic model are transferred from the non-volatile ROM 804 to the volatile RAM 803 in the DSP 802 and then the DSP 802 performs voice processing. Such a method allows the DSP 802 to perform voice processing once the necessary programs are transferred to the volatile RAM 803 in the DSP 802. The processing speed is not lowered because the CPU 801 does not occupy the bus 805. However, the volatile RAM 803 needs to have a relatively large memory capacity in order to store all the necessary programs. Such a large memory capacity also tends to prevent reduction in the size and weight of a mobile electronic device including the voice processing system.

Conventional mobile electronic devices including cellular phones adopt a microprocessor or a DSP having a relatively low processing capability. In order to perform real-time voice processing in such a mobile electronic device, the DSP needs to be controlled by a CPU so as to efficiently access a non-volatile memory for storing a program used for performing voice processing and a volatile memory for storing intermediate data obtained by voice processing. However, a voice processing system having a conventional bus structure does not allow the DSP to write the intermediate data to the volatile memory while accessing the dictionary data stored in the non-volatile memory.

Today, mobile electronic devices, which have been conventionally used mainly for cellular phone conversation, are used in a wider range of applications requiring a higher level of security such as, for example, network shopping and online banking. Accordingly, a system usable in such a wider range of applications is in demand. A mobile electronic device, having a voice recognition system for managing personal identification information as security means for preventing the mobile electronic device from being illegally used by a third party, instead of a simple voice dialing function mounted on an existing cellular phone, is demanded.

SUMMARY OF THE INVENTION

A signal processing system according to the present invention includes an A/D conversion section for converting an analog signal input from an external device into a digital signal; a digital signal processing section for processing the digital signal; a D/A conversion section for converting the digital signal processed by the digital signal processing section into an analog signal; a control section for controlling the A/D conversion section, the digital signal processing section, and the D/A conversion section; and a memory section including a first program memory area for storing a program for processing the digital signal and a first data memory area. The digital signal processing section includes a second program memory area connected, via a first bus, to the first program memory area, and a second data memory area connected to the first data memory area via a second bus. The control section transfers the program stored in the first program memory area to the second program memory area via the first bus, and executes the program thus stored in the second program memory area, so as to control the processing of the digital signal performed by the digital signal processing section. The control section stores the digital signal processed by the digital signal processing section in the second data memory area, transfers at least a part of the digital signal stored in the second data memory area to the first data memory area via the second bus, and transfers the digital signal stored in the first data memory area to the second data memory area via the second bus, so as to control the processing of the digital signal performed by the digital signal processing section.

In one embodiment of the invention, the analog signal input from the external device is a voice signal.

In one embodiment of the invention, the first program memory area further stores data for comparison. The second data memory area is connected to the first program memory area via a third bus. The control section controls the digital signal processing section to read the data for comparison stored in the first program memory area and to compare the digital signal with the data for comparison.

In one embodiment of the invention, the first program memory area is a rewritable non-volatile memory, and the first data memory area is a high-speed writable memory.

In one embodiment of the invention, the high-speed writable memory is a volatile memory.

In one embodiment of the invention, the signal processing system further includes a third data memory area connected to the first program memory area, wherein the control section stores external information received by a communication device in the third data memory area and transfers the external information stored in the third data memory area to the first program memory area.

In one embodiment of the invention, the first program memory area includes a first non-volatile memory cell unit including at least one non-volatile memory cell, and a second non-volatile memory cell unit including at least one non-volatile memory cell. The signal processing system further includes a comparison section for comparing the digital signal and data stored in each of the at least one non-volatile memory cell in the first non-volatile memory cell unit, and a lock section for selectively placing the second non-volatile memory cell unit into a state accessible by the control section or a state inaccessible by the control section. The first non-volatile memory cell unit is in the state accessible by the control section regardless of a state of the signal processing system. The second non-volatile memory cell unit is in the state inaccessible by the control section when the signal processing system is turned on or reset. When the digital signal matches the data stored in any of the at least one non-volatile memory cell in the first non-volatile memory cell unit, the control section controls the lock section to change the state inaccessible by the control section of the second non-volatile memory cell unit into the state accessible by the control section.

In one embodiment of the invention, the data stored in each of the at least one non-volatile memory cell in the first non-volatile memory cell unit is voice feature amount data of an individual.

In one embodiment of the invention, when the digital signal matches the data stored in any of the at least one non-volatile memory cell in the first non-volatile memory cell unit, the control section controls the lock section to change the state inaccessible by the control section of at least one non-volatile memory cell in the second non-volatile memory cell unit, which corresponds to the non-volatile memory cell in the first non-volatile memory cell unit storing the data matching the digital signal, into the state accessible by the control section.

In one embodiment of the invention, the first non-volatile memory cell unit includes a one-time programmable memory.

In one embodiment of the invention, the first program memory area includes a first non-volatile memory cell unit including at least one non-volatile memory cell, and a second non-volatile memory cell unit including at least one non-volatile memory cell. The signal processing system further includes a comparison section for comparing the digital signal and data stored in each of the at least one non-volatile memory cell in the first non-volatile memory cell unit, a lock section for selectively placing each of the first non-volatile memory cell unit and the second non-volatile memory cell unit into a state accessible by the control section or a state inaccessible by the control section, and a counting section for counting a number of times at which the digital signal does not match the data stored in any of the at least one non-volatile memory cell in the first non-volatile memory cell unit. The first non-volatile memory cell unit is in the state accessible by the control section when the signal processing system is turned on or reset. The second non-volatile memory cell unit is in the state inaccessible by the control section when the signal processing system is turned on or reset. When the number of times counted by the counting section reaches a predetermined value, the control section controls the lock section to change the state accessible by the control section of the first non-volatile memory cell unit into the state inaccessible by the control section and to maintain the second non-volatile memory cell unit in the state inaccessible by the control section.

A signal processing system according to the present invention includes an A/D conversion section for converting an analog signal input from an external device into a digital signal; a digital signal processing section for processing the digital signal; a D/A conversion section for converting the digital signal processed by the digital signal processing section into an analog signal; and a control section for controlling the A/D conversion section, the digital signal processing section, and the D/A conversion section. The digital signal processing section includes a second program memory area connected, via a first bus, to a first program memory area storing a program for processing the digital signal, and a second data memory area connected to a first data memory area via a second bus. Due to such a structure, the control section controls the elements in the signal processing system so that the first bus is used to transfer the program stored in the first program memory area to the second program memory area, while the second bus is used to write the digital signal processed by the data signal processing section to the first program memory area and/or to read the digital signal stored in the first program memory area. As a result, the real-time signal processing can be realized without increasing the number of elements of the signal processing system.

Utilizing the non-volatility of the first program memory area, an improved level of security can be provided. Especially in the case where data read from memory cells other than a specific memory cell is prevented when the signal processing system is turned on or reset, the signal processing system is not usable by a third party other than the registered individual(s).

In the case where a writable non-volatile memory is used, information downloaded by a communication device such as a cellular phone, can be written and stored in the first data memory area at a high speed while realizing the high level of security. A voice recognition application can be customized in conformity to the user's preference. Thus, signal processing systems, for example, voice processing systems usable for a variety of applications can be provided.

Thus, the invention described herein makes possible the advantages of providing (1) a signal processing system having a bus structure for realizing real-time signal processing without increasing the number of elements of the signal processing system and (2) a signal processing system having a high level security function.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings.

EXAMPLE 1

In a first example according to the present invention, a signal processing system including an improved bus structure between a DSP and a rewritable non-volatile memory will be described.

Figure 1:
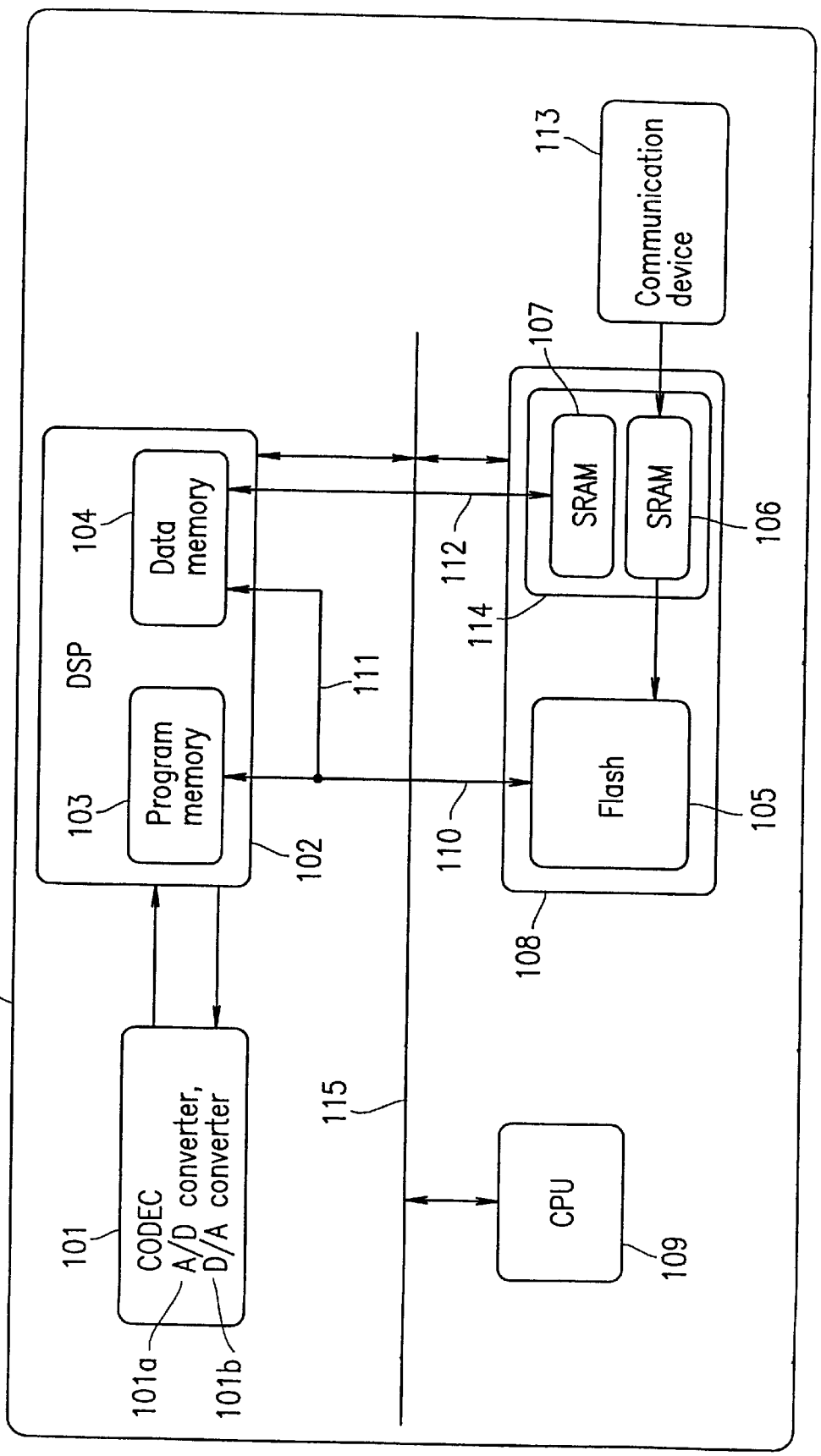
FIG. 1 is a block diagram illustrating a signal processing system according to a first example of the present invention.

FIG. 1 is a block diagram of a signal processing system 100 according to the first example.

The signal processing system 100 shown in FIG. 1 includes a CODEC 101 including an A/D converter 101a (A/D conversion section) and a D/A converter (D/A conversion section) 101b, a memory section 108 including a rewritable non-volatile flash memory (first program memory area) 105 and a writable memory area (first data memory area) 114, a DSP (digital signal processing section) 102 including a program memory (second program memory area) 103 and a data memory (second data memory area) 104, a microprocessor (CPU or control section) 109, and a communication device 113. The writable memory area 114 includes writable volatile SRAMs 106 and 107. The communication device 113 can be, for example, a cellular phone.

The DSP 102, the memory section 108 and the microprocessor 109 are connected to each other via a fourth bus 115. The program memory 103 and the non-volatile flash memory 105 are connected to each other by a first bus 110. The data memory 104 and the non-volatile flash memory 105 are connected to each other by a third bus 111. The data memory 104 and the writable volatile SRAM 107 are connected to each other by a second bus 112. In the first example, the third bus 111 is branched from the first bus 110, but the first bus 110 and the third bus 111 may be separate buses.

The A/D converter 101a converts an analog signal input from an external device into a digital signal. The analog signal input from the external device is a voice signal in the first example, but may be any other type of signal. A D/A converter 101b converts a digital signal obtained by the process performed by the DSP 102 into an analog signal. In the first example, the CODEC 101 includes both the A/D converter 101a and the D/A converter The rewritable non-volatile flash memory 105 stores a signal processing program (for example, a voice recognition program or a voice synthesis program) and data for comparison (dictionary data or an acoustic model). In the first example, the flash memory 105 is used as a rewritable non-volatile memory, but any other appropriate type of memory may be used as the rewritable non-volatile memory.

The writable volatile SRAM 107 included in the volatile memory area 114 stores at least a part of the digital signal obtained by processing performed by the DSP 102. The writable volatile SRAM 106 included in the volatile memory area 114 temporarily stores external information received by the communication device 113 (for example, the voice processing program and the data for comparison). The writable volatile SRAM 106 is controlled by the microprocessor 109 to transfer the external information to the rewritable non-volatile flash memory 105 at a high speed when necessary.

In the first example, the memory section 108 includes the rewritable non-volatile flash memory 105 and the two writable volatile SRAMs 106 and 107. The structure of the memory section 108 is not limited to this. For example, the non-volatile memory section 108 may be a non-volatile memory having a volatile memory area which is accessible at a high speed described in Japanese Application No. 2000-176182 filed by the Applicant of the present application. The volatile memory area included in the non-volatile memory described in Japanese Application No. 2000-176182 is divided into a plurality of memory cells. The control device controls the elements of the system so that data stored in a specific volatile memory cell is transferred to the non-volatile memory cell while data is read from or written to another volatile memory cell. When such a non-volatile memory is used in the signal processing system 100, the microprocessor 109 may control the relevant elements so that external information received by the communication device 113 and stored in a specific volatile memory cell is transferred to the non-volatile memory, and the DSP 102 accesses another volatile memory cell for data read or write. According to such a system, signal processing is not interrupted and thus the signal processing speed can be increased.

The writable memory area 114 is not limited to include volatile memories, and may include any type of memories writable at a high speed (high-speed writable memories). For example, the writable memory area 114 may include non-volatile memories such as ferroelectric memories. In the case where the writable memory area 114 includes non-volatile memories writable at a high speed, the writable memory area 114 acts as a one-chip memory device including all the required memory areas. This is effective to reduce the size and weight of the mobile electronic device because the number of required devices is decreased.

The microprocessor 109 controls the entire signal processing system 100, and especially controls execution of the voice recognition program and digital transfer of the signal processing program. By an instruction from the microprocessor 109, the signal processing program stored in the rewritable non-volatile flash memory 105 is transferred to the program memory 103 and executed.

The program memory 103 in the DSP 102 stores the signal processing program transferred from the rewritable non-volatile flash memory 105 by the instruction from the microprocessor 109. The DSP 102 processes a digital signal in accordance with the signal processing program. The DSP 102 is controlled by the microprocessor 109 to read the data for comparison (for example, an acoustic model or dictionary data) stored in the rewritable non-volatile flash memory 105 via the third bus 111, compare the digital signal converted from the analog signal by the A/D converter 101a with the data for comparison, and store the comparison result in the data memory 104.

The signal processing system 100 operates, for example, as described in steps S21 through S23 below.

Step S21: An analog signal input from an external device is converted into a digital signal by the A/D converter 101a in the CODEC 101.

Step S22: When the signal processing system 100 is turned on, the microprocessor 109 transfers the signal processing program stored in the rewritable non-volatile flash memory 105 to the program memory 103 in the DSP 102 via the first bus 110.

Step S23: The DSP 102 extracts, from the digital signal obtained in step S21, a feature amount of the digital signal, by which the voice recognition program can specify the type of the voice (input analog signal). The extraction is performed by, for example, calculation. Steps S23 includes sub-steps S23a and S23b. Steps S23a and S23b are performed simultaneously.

Sub-step S23a: The DSP 102 reads the data for comparison stored in the rewritable non-volatile flash memory 105 (for example, the acoustic model or the dictionary data) in real-time via the third bus 111, and compares the digital signal and the read data.

Sub-step S23b: The DSP 102 writes at least a part of the digital signal processed in step S23a, which is the comparison result to be stored in the data memory 104, to the writable volatile SRAM 107 via the second bus 112 without any wait time. Alternatively, the DSP 102 reads the digital signal written in the writable volatile SRAM 107 without any wait time.

Sub-steps S23a and S23b can be performed simultaneously because the DSP 102 has a bus structure having the first bus 110, the third bus 111 and the second bus 112 respectively via which the DSP 102 (more specifically, the program memory 103 and the data memory 104 in the DSP 102) can access the rewritable non-volatile flash memory 105 and the writable memory area 114 (more specifically, the writable volatile SRAM 107), separately. While the first bus 110 and the third bus 111 are exclusively used for transferring the data from the rewritable non-volatile flash memory 105, the second bus 112 can be exclusively used for writing data to the writable volatile SRAM 107 and/or reading the data written in the writable volatile SRAM 107. Therefore the signal processing system 100 can realize real-time signal processing without increasing the number of elements in the signal processing system 100.

Utilizing, to the maximum possible extent, the above-described bus structure by which the DSP 102 can access the writable memory area 114 and the rewritable non-volatile flash memory 105 separately, the signal processing system 100 according to the present invention can perform efficient signal processing. When used for a voice processing system requiring a large vocabulary, the signal processing system 100 increases the speed of the comparison between the feature amount of the input voice signal and the dictionary data.

The elements of the signal processing system 100 are controlled by the microprocessor 109 so that external information received by the communication device 113 is written once in the writable volatile SRAM 106, to which data can be written at a high speed, and then transferred to the rewritable non-volatile flash memory 105 at a high speed when necessary. Since the external information is eventually written in the non-volatile memory 105, the entire system need not be exchanged when a program or data for comparison is updated. In addition, the communication speed of mobile information communication terminals are now increasing. The signal processing system 100 has an advantage of reducing the capacity of built-in volatile memories.

The reason is that a volatile memory built in a conventional signal processing system is used as a buffer for communication data as well as for storing a program for communication, and therefore requires a large capacity.

In the signal processing system 100, the two writable volatile SRAMs 106 and 107 are provided and the writable volatile SRAM 107 is connected to the DSP 102. Therefore, data read and write between the data memory 104 and the writable volatile SRAM 107 is performed parallel to (i) data write of the external information received by the communication device 113 to the writable volatile SRAM 106 and/or (ii) transfer of the external information from the writable volatile SRAM 106 to the rewritable non-volatile flash memory 105.

In the case where the DSP 102 has a high processing capability, the DSP 102 can be structured to also have the function of the microprocessor 109.

The signal processing systems according to the following examples of the present invention utilize the non-volatility of the memory section 108.

EXAMPLE 2

In a second example according to the present invention, a signal processing system which becomes operable only when voice which matches feature amount data of the voice of a registered individual is input from an external device will be described.

Figure 2:
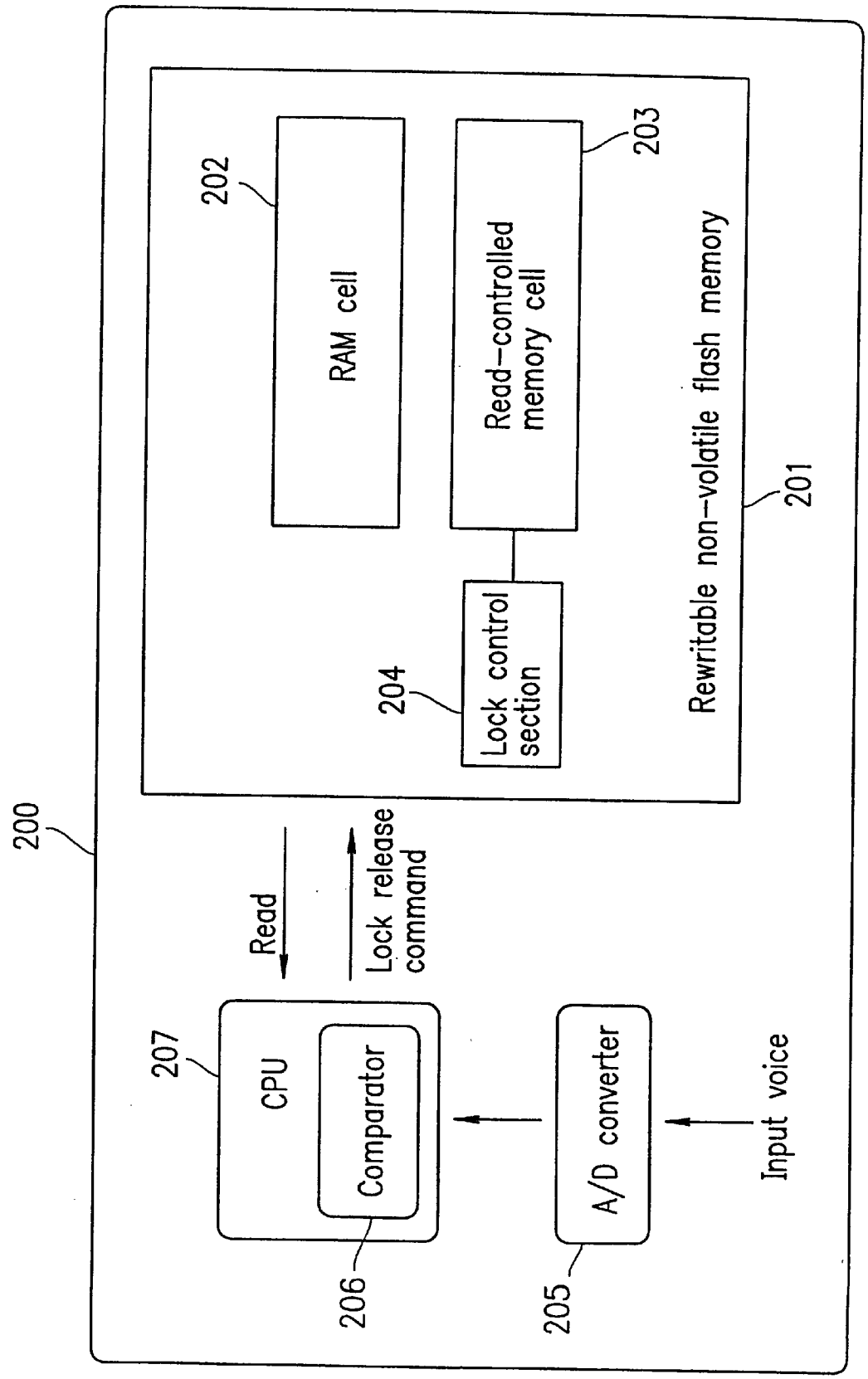
FIG. 2 is a block diagram illustrating a part of a signal processing system according to a second example of the present invention.

FIG. 2 is a block diagram illustrating a part of the signal processing system 200 according to the second example. For the sake of simplicity, FIG. 2 only shows a rewritable non-volatile flash memory 201, a microprocessor 207, and an A/D converter 205 in the CODEC in the signal processing system 200. The other elements of the signal processing system 200 are substantially the same as those of the signal processing system 100 in FIG. 1, and will not be described in detail.

The rewritable non-volatile flash memory 201 includes a random access memory (RAM) cell (first non-volatile memory cell unit) 202 and a read-controlled memory cell (second non-volatile memory cell unit) 203. A data reading operation from the read-controlled memory cell 203 is controlled by a lock control section (lock section) 204 also included in the rewritable non-volatile flash memory 201.

The microprocessor 207 includes a comparator (comparison section) 206. The comparator 206 compares feature amount data of an input voice and voice feature amount data stored in the RAM cell 202. The lock control section 204 selectively allows the read-controlled memory cell 203 to be accessed by the microprocessor 207 or prevents the read-controlled memory cell 203 from being accessed by the microprocessor 207. In the second example, the comparator 206 is included in the microprocessor 207, but may be provided as a function block independent from the microprocessor 207.

The RAM cell 202 is accessible by the microprocessor 207 and allows data to be read therefrom regardless of the state of the signal processing system 200. The RAM cell 202 stores, for example, a voice feature amount of a registered individual as data. The data stored in the RAM cell 202 may be arbitrary data by which a specific individual can be recognized.

The read-controlled memory cell 203 is controlled by the lock control section 204 so as to be inaccessible (i.e., so that data cannot be read from the read-controlled memory cell 203) when the signal processing system 200 is turned on or reset. Herein, the term "activation" is defined as placing a memory into an accessible state, and the term "inactivation" is defined as placing a memory into an inaccessible state.

The read-controlled memory cell 203 is activated, for example, as follows.

An analog voice signal input from an external device is converted into a digital signal by the A/D converter 205. Voice feature amount data is extracted from the digital signal by the method described in the first example and then is input to the microprocessor 207. The comparator 206 in the microprocessor 207 compares the extracted voice feature amount data and voice feature amount data of an individual stored in the RAM cell 202, which is made accessible when the signal processing system 200 is turned on. When both the feature amount data match each other, the microprocessor 207 sends an operation control command (a lock release command) for activating the read-controlled memory cell 203 to the lock control section 204. Upon receipt of the lock release command, the lock control section 204 activates the read-controlled memory cell 203 to be accessible.

A feature of the signal processing system 200 is that the rewritable non-volatile flash memory 201 includes a plurality of memory cells, and a specific memory cell among the plurality of memory cells is activated (i.e., made accessible) when the signal processing system 200 is turned on. According to such a structure, only information stored in the specific memory cell which is activated can be read in an initial state immediately after the signal processing system 200 is turned on. Unless the analog voice input from an external device is determined to be identical with the voice of a registered individual, the rewritable non-volatile flash memory 201 and the signal processing system 200 itself including the rewritable non-volatile flash memory 201 are made inoperable. In this manner, illegal use of information by an unregistered third party is prevented so as to improve the level of security.

In the second example, the signal processing system 200 includes one RAM cell 202 and one read-controlled memory cell 203. The number of each of these memory cells is not limited to any specific number, and the signal processing system 200 may include a plurality of read-controlled memory cells 203.

In such a structure, when the feature amount data extracted from the input analog voice signal matches the voice feature amount of a registered individual stored in the RAM cell 202, the microprocessor 207 may send an operation control command for activating all the plurality of read-controlled memory cells 203 to the lock control section 204 or may send an operation control command for activating only a specific read-controlled memory cell 203 to the lock control section 204. Each of the plurality of read-controlled memory cells 203 may include a control circuit for controlling the input of an operation control command.

EXAMPLE 3

In a third example according to the present invention, a signal processing system which becomes operable only when a voice which matches feature amount data of a voice of a plurality of registered individuals is input from an external device will be described. The signal processing system according to the third example is usable for a plurality of individuals.

Figure 3:
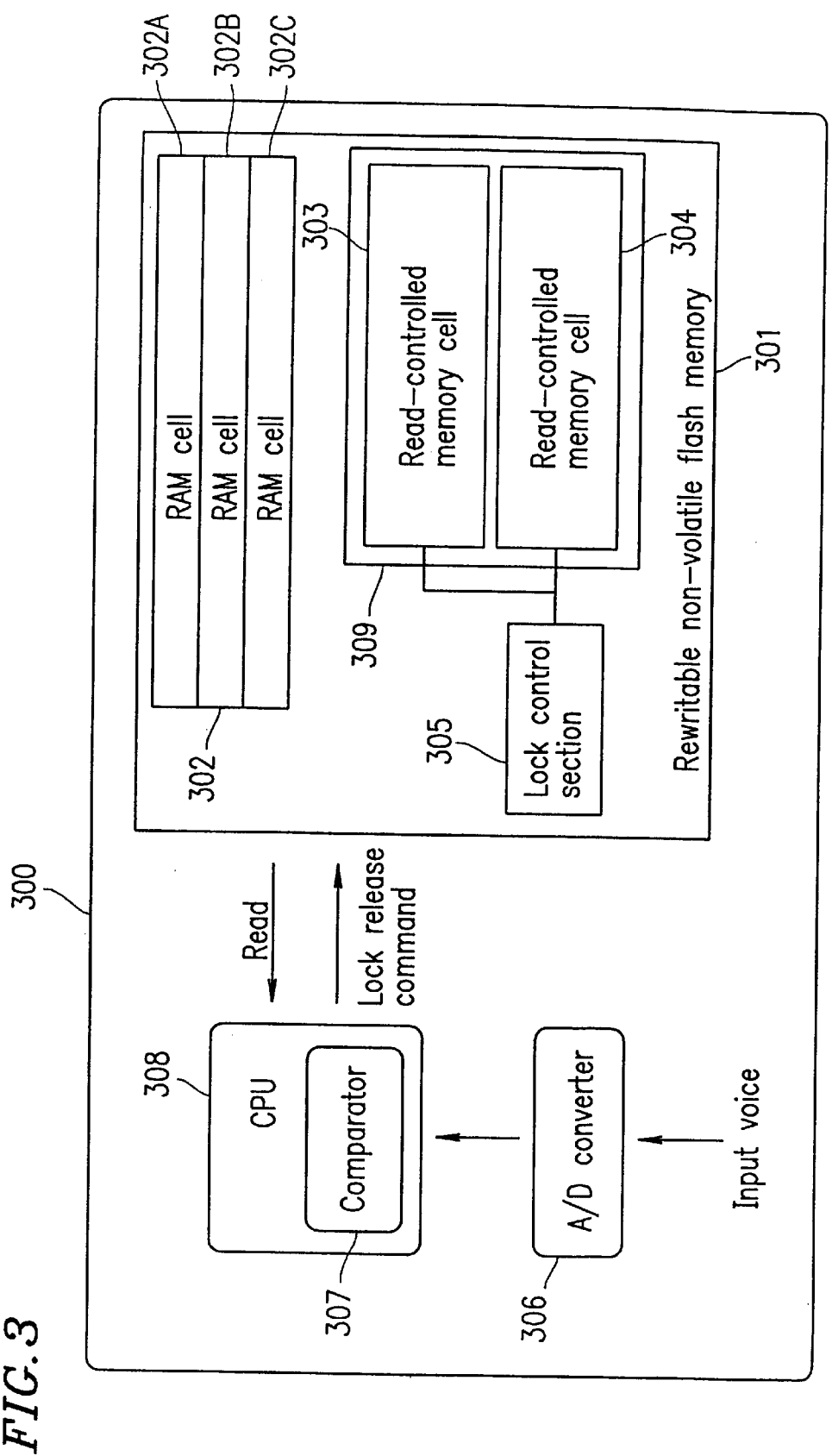
FIG. 3 is a block diagram illustrating a part of a signal processing system according to a third example of the present invention.

FIG. 3 is a block diagram illustrating a part of the signal processing system 300 according to the third example. For the sake of simplicity, FIG. 3 only shows a rewritable non-volatile flash memory 301, a microprocessor 308, and an A/D converter 306 in the CODEC in the signal processing system 300. The other elements of the signal processing system 300 are substantially the same as those of the signal processing system 100 in FIG. 1, and will not be described in detail.

The rewritable non-volatile flash memory 301 includes a random access memory (RAM) cell unit (first non-volatile memory cell unit) 302 including a plurality of RAM cells 302A, 302B and 302C, and a read-controlled memory cell unit (second non-volatile memory cell unit) 309 including a plurality of read-controlled memory cells 303 and 304. A data read operation of the read-controlled memory cells 303 and 304 in the read-controlled memory cell unit 309 is controlled by a lock control section (lock section) 305 also included in the rewritable non-volatile flash memory 301.

In the example shown in FIG. 3, the RAM cell unit 302 includes the three RAM cells 302A, 302B and 302C and the read-controlled memory cell unit 309 includes the two read-controlled memory cells 303 and 304, but the number of memory cells in each of the RAM cell unit 302 and the read-controlled memory cell unit 309 is not limited to any specific number.

The microprocessor 308 includes a comparator (comparison section) 307. The comparator 307 compares feature amount data of an input voice and voice feature amount data of a registered individual stored in each of the RAM cells 302A, 302B and 302C. The lock control section 305 selectively allows the read-controlled memory cell unit 309 to be accessed by the microprocessor 308 or prevents the read-controlled memory cell unit 309 from being accessed by the microprocessor 308. In the third example, the comparator 307 is included in the microprocessor 308, but may be provided as a function block independent from the microprocessor 308.

The RAM cell unit 302 is accessible by the microprocessor 308 and allows data to be read therefrom regardless of the state of the signal processing system 300. The RAM cells 302A, 302B and 303C each store, for example, a voice feature amount of an individual as data.

The read-controlled memory cell unit 309 is controlled by the lock control section 305 so as to be inaccessible (i.e., so that data cannot be read from the read-controlled memory cell unit 309) when the signal processing system 300 is turned on or reset.

The read-controlled memory cell unit 309 is activated, for example, as follows.

An analog voice signal input from an external device is converted into a digital signal by the A/D converter 306. Voice feature amount data is extracted from the digital signal by the method described in the first example and then is input to the microprocessor 308. The comparator 307 in the microprocessor 308 compares the extracted voice feature amount data and voice feature amount data of an individual stored in each of the RAM cells 302A, 302B and 302C, which are made accessible when the signal processing system 300 is turned on.

When the extracted voice feature amount data matches the voice feature amount data of an individual stored in the RAM cell 302A, the microprocessor 308 sends an operation control command (a lock release command) for activating only the read-controlled memory cell 303 to the lock control section 305. When the extracted voice feature amount data matches the voice feature amount data of an individual stored in the RAM cell 302B, the microprocessor 308 sends an operation control command for activating only the read-controlled memory cell 304 to the lock control section 305.

When the extracted voice feature amount data matches the voice feature amount data of an individual stored in the RAM cell 302C, the microprocessor 308 sends an operation control command for activating both the read-controlled memory cells 303 and 304 to the lock control section 305. In accordance with the lock release command received, the lock control section 305 activates the read-controlled memory cell 303, the read-controlled memory cell 304, or both the read-controlled memory cells 303 and 304 to be accessible.

The relationship of the RAM cells 302A, 302B and 302C with the read-controlled memory cells 303 and 304 is not limited to the above-described relationship. For example, when the extracted voice feature amount data matches the voice feature amount data of an individual stored in the RAM cell 302A, the microprocessor 308 may send an operation control command for activating both the read-controlled memory cells 303 and 304 to the lock control section 305.

In the signal processing system 300, the read-controlled memory cell(s) to be activated is changed in accordance with the registered individual whose voice is determined to match the input voice. Therefore, the signal processing system 300 is usable for a plurality of individuals while protecting information of each of the plurality of individuals. When the extracted voice feature amount data matches none of the voice feature amount data stored in any of RAM cells in the RAM cell unit 302, the rewritable non-volatile flash memory 301 cannot be activated.

EXAMPLE 4

In a fourth example according to the present invention, a signal processing system having a further improved level of security in voice recognition will be described.

Figure 4:
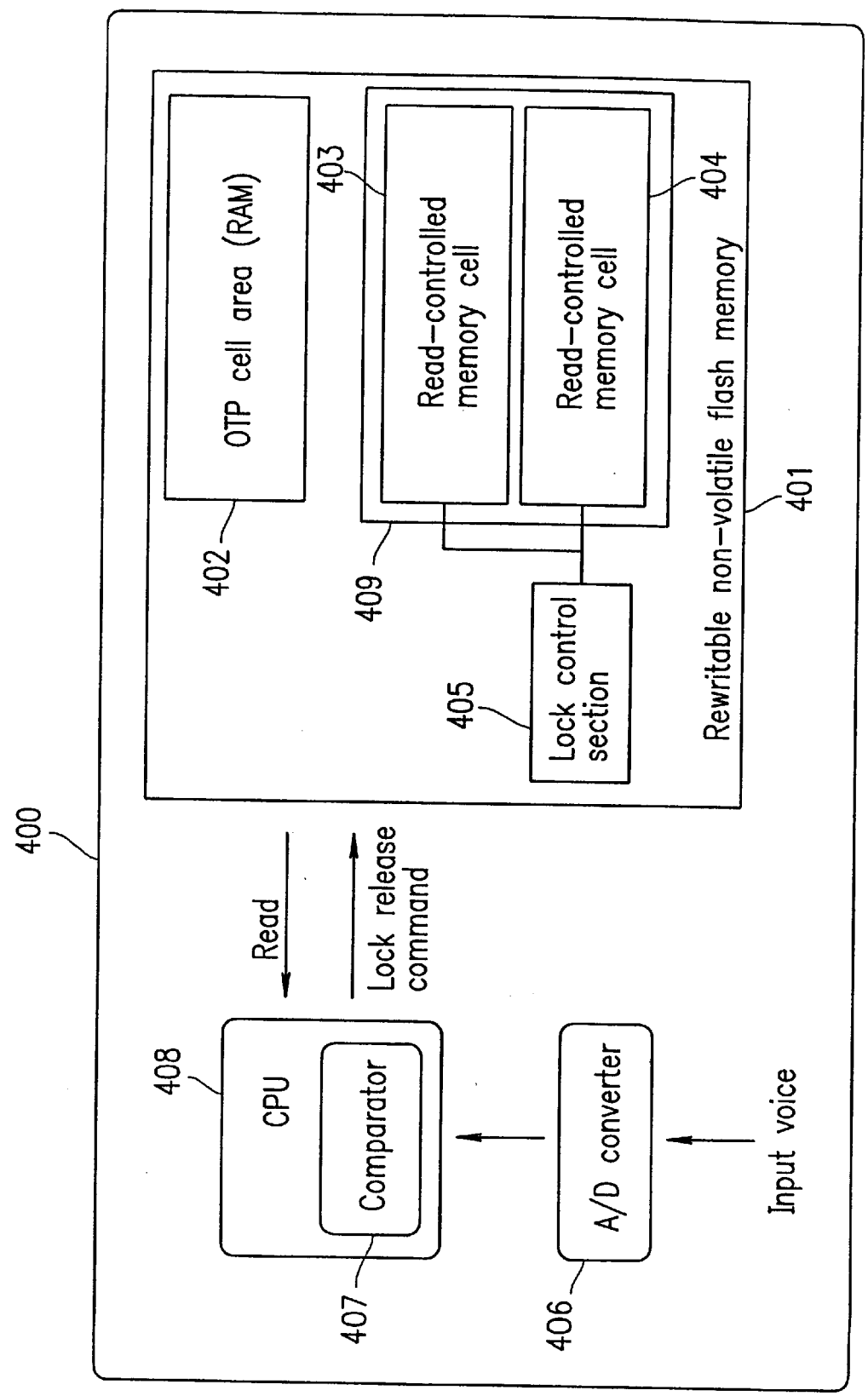
FIG. 4 is a block diagram illustrating a part of a signal processing system according to a fourth example of the present invention.

FIG. 4 is a block diagram illustrating a part of the signal processing system 400 according to the fourth example. For the sake of simplicity, FIG. 4 only shows a rewritable non-volatile flash memory 401, a microprocessor 408, and an A/D converter 406 in the CODEC in the signal processing system 400.

The rewritable non-volatile flash memory 401 includes a random access memory (RAM) cell (first non-volatile memory cell unit) 402 and a read-controlled memory cell unit (second non-volatile memory cell unit) 409 including a plurality of read-controlled memory cells 403 and 404. A data read operation of the read-controlled memory cells 403 and 404 in the read-controlled memory cell unit 409 is controlled by a lock control section (lock section) 405 also included in the rewritable non-volatile flash memory 401.

The RAM cell 402 includes an OTP (one-time programmable) non-volatile ROM. In the following description, the RAM cell 402 will also be referred to as an "OTP cell area 402". In the example shown in FIG. 4, the read-controlled memory cell unit 409 includes the two read-controlled memory cells 403 and 404, but the number of memory cells in the read-controlled memory cell unit 409 is not limited to any specific number.

The microprocessor 408 includes a comparator (comparison section) 407. The comparator 407 compares feature amount data of an input voice and voice feature amount data of a registered individual stored in the RAM cell 402. The lock control section 405 selectively allows the read-controlled memory cell unit 409 to be accessed by the microprocessor 408 or prevents the read-controlled memory cell unit 409 from being accessed by the microprocessor 408. In the fourth example, the comparator 407 is included in the microprocessor 408, but may be provided as a function block independent from the microprocessor 408.

The OTP cell area 402 is accessible by the microprocessor 408 and allows data to be read therefrom regardless of the state of the signal processing system 400. The OTP cell area 402 stores, for example, a voice feature amount of an individual as data.

The read-controlled memory cell unit 409 is controlled by the lock control section 405 so as to be inaccessible (i.e., so that data cannot be read from the read-controlled memory cell unit 409) when the signal processing system 400 is turned on or reset.

The signal processing system 400 has substantially the same structure as that of the signal processing system 200 except for the structure of the RAM cell 402.

The read-controlled memory cell unit 409 is activated, for example, as follows.

An analog voice signal input from an external device is converted into a digital signal by the A/D converter 406. Voice feature amount data is extracted from the digital signal by the method described in the first example and then is input to the microprocessor 408. The comparator 407 in the microprocessor 408 compares the extracted voice feature amount data and voice feature amount data of an individual stored in the OTP cell area 402, which is made accessible when the signal processing system 400 is turned on.

When the extracted voice feature amount data matches the voice feature amount data of an individual stored in the OPT cell area 402, the microprocessor 408 sends an operation control command (a lock release command) for activating the read-controlled memory cell unit 409 to the lock control section 405. In accordance with the lock release command received, the lock control section 405 activates the read-controlled memory cell unit 409 to be accessible.

In the fourth example, the OTP cell area 402 includes one OTP cell area, but may include a plurality of OTP cell areas. In the structure where the OTP cell area 402 includes a plurality of OTP cell areas, the lock control section 405 may activate at least one of the read-controlled memory cells 403 and 404 in accordance with the OPT cell which has data matching the input voice. The number of the read-controlled memory cells included in the read-controlled memory cell unit 409 is not limited to two, and may be any other number.

The OTP cell area 402 never allows data written therein to be rewritten, and therefore prevents a third party other than a registered individual (i.e., the individual having the voice feature amount data or other information usable to specify the individual stored in the OTP cell area 402) from rewriting such information. Thus, when incorporated in a mobile electronic device or the like, the signal processing system 400 provides a higher level of security.

EXAMPLE 5

In a fifth example according to the present invention, a signal processing system having a further improved level of security in voice recognition will be described.

Figure 5:
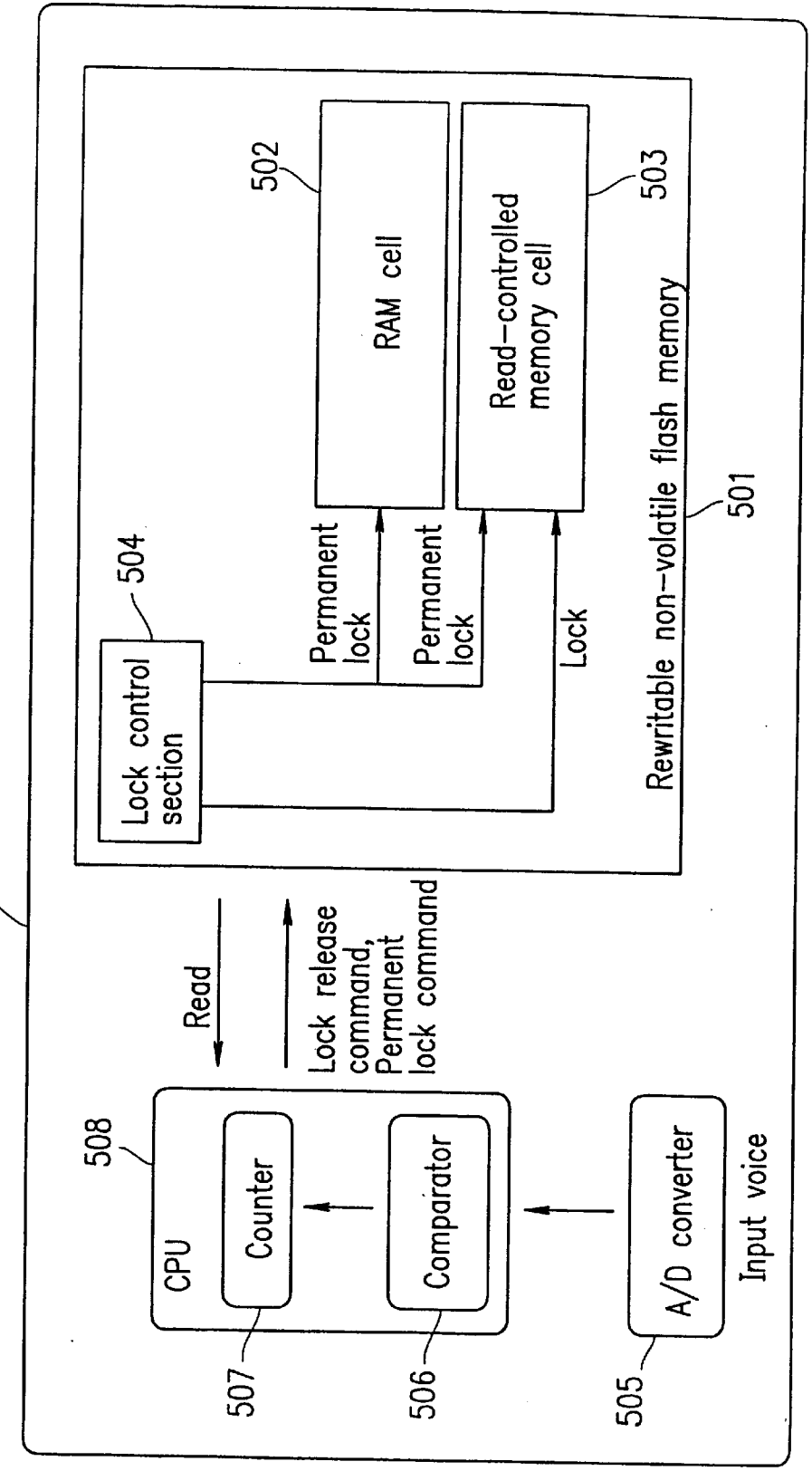
FIG. 5 is a block diagram illustrating a part of a signal processing system according to a fifth example of the present invention.
Figure 6:
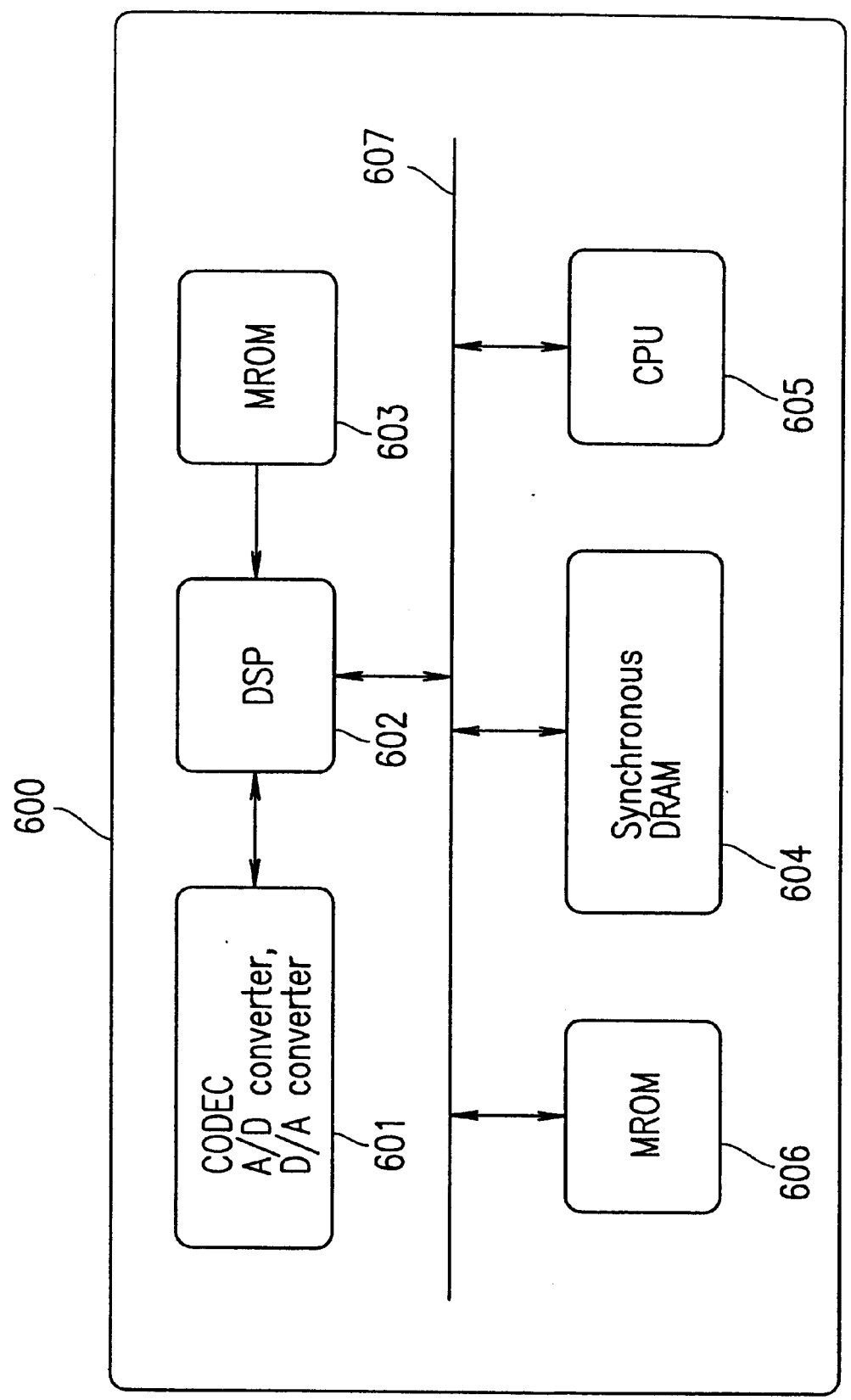
FIG. 6 is a block diagram illustrating a conventional voice processing system.
Figure 7:
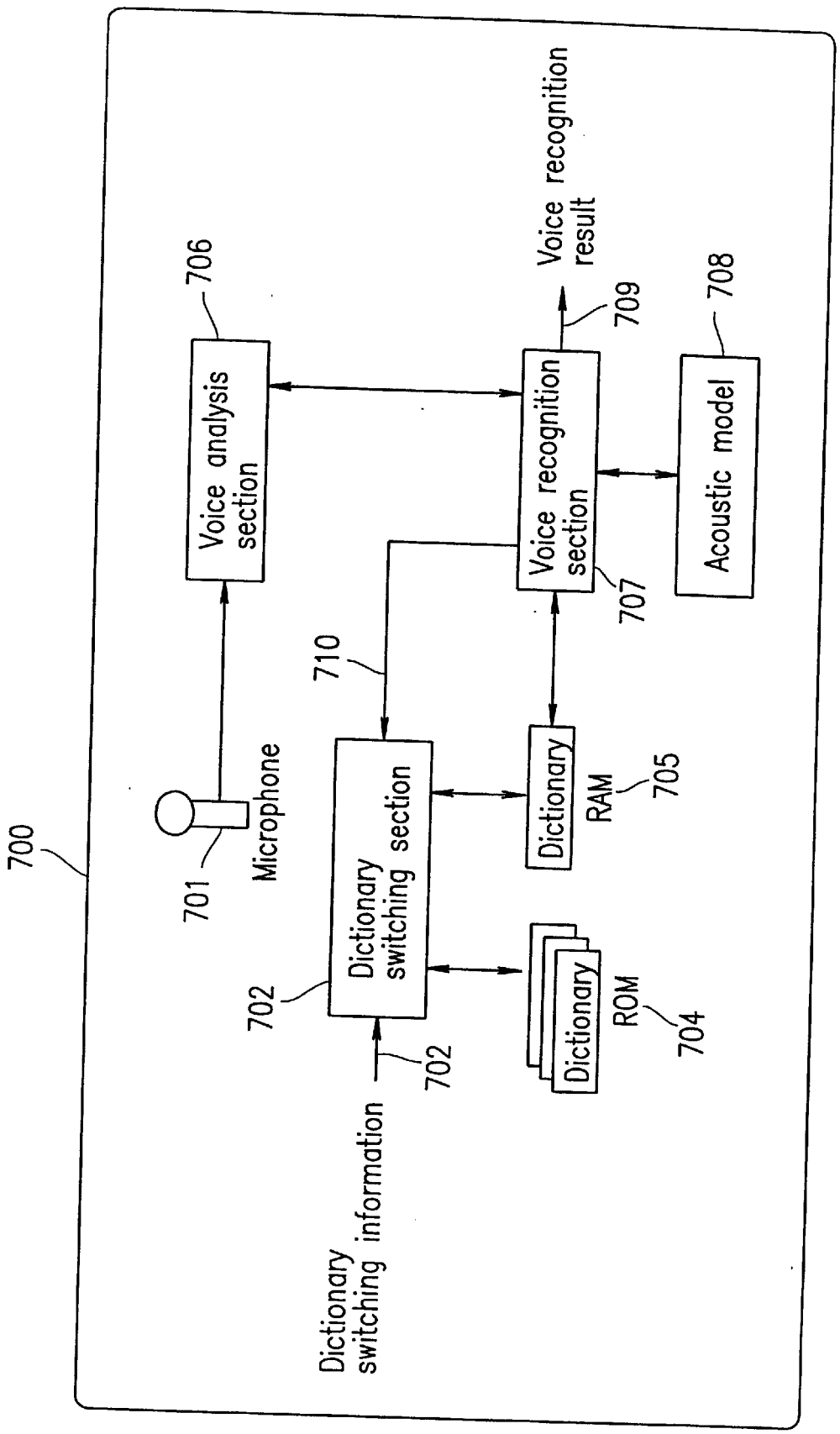
FIG. 7 is a block diagram illustrating another conventional voice recognition system used for car navigation.
Figure 8:
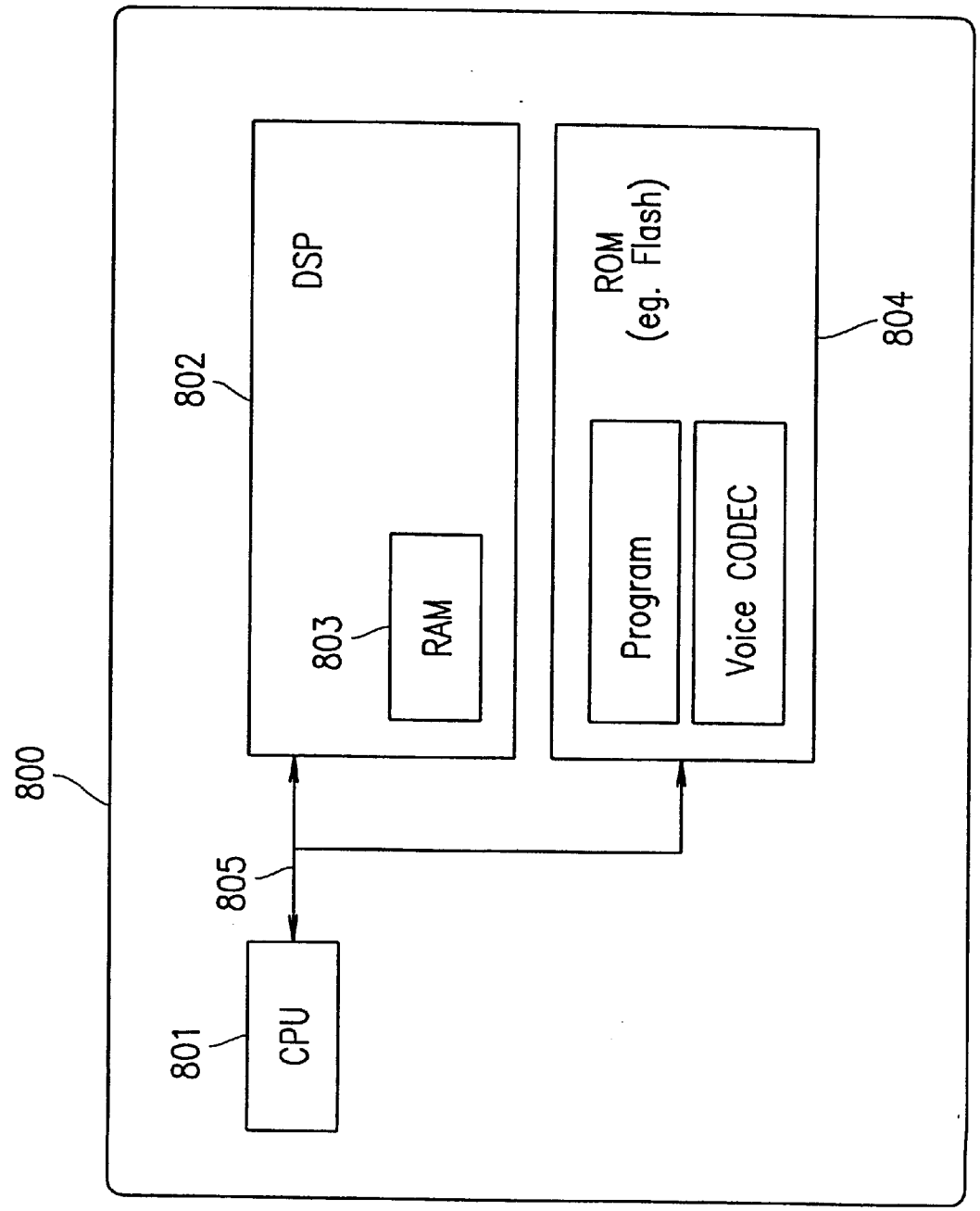
FIG. 8 is a block diagram illustrating still another voice processing system used in a cellular phone

FIG. 5 is a block diagram illustrating a part of the signal processing system 500 according to the fifth example. For the sake of simplicity, FIG. 5 only shows a rewritable non-volatile flash memory 501, a microprocessor 508, and an A/D converter 505 in the CODEC in the signal processing system 500. The other elements of the signal processing system 500 are substantially the same as those of the signal processing system 100 in FIG. 1, and will not be described in detail.

The rewritable non-volatile flash memory 501 includes a readable memory cell (first non-volatile memory cell) 502 and a read-controlled memory cell (second non-volatile memory cell) 503. A data read operation of the read-controlled memory cell 503 is controlled by a lock control section (lock section) 504 also included in the rewritable non-volatile flash memory 501.

The microprocessor 508 includes a comparator (comparison section) 506 and a counter (counting section) 507. The comparator 506 compares feature amount data of an input voice and voice feature amount data of a registered individual stored in the readable memory cell 502. The counter 507 counts the number of times by which the feature amount data of an input voice does not match the voice feature amount data stored in the readable memory cell 502. In the fifth example, the comparator 506 and the counter 507 are included in the microprocessor 508, but each of the comparator 506 and the counter 507 may be provided as a function block independent from the microprocessor 508.

The lock control section 504 selectively allows each of the readable memory cell 502 and the read-controlled memory cell 503 to be accessed by the microprocessor 508 or prevents each of the readable memory cell 502 and the read-controlled memory cell 503 from being accessed by the microprocessor 508.

The readable memory cell 502 is accessible by the microprocessor 508 and allows data to be read therefrom when the signal processing system 500 is turned on or reset. The readable memory cell 502 stores, for example, a voice feature amount of an individual as data.

The read-controlled memory cell 503 is controlled by the lock control section 504 so as to be inaccessible (i.e., so that data cannot be read from the read-controlled memory cell 503) when the signal processing system 500 is turned on or reset.

The signal processing system 500 operates, for example, as follows.

An analog voice signal input from an external device is converted into a digital signal by the A/D converter 505. Voice feature amount data is extracted from the digital signal by the method described in the first example and then is input to the microprocessor 508. The comparator 506 in the microprocessor 508 compares the extracted voice feature amount data and voice feature amount data of an individual stored in the readable memory cell 502, which is made accessible when the signal processing system 500 is turned on.

When the extracted voice feature amount data matches the voice feature amount data of an individual stored in the readable memory cell 502, the microprocessor 508 sends an operation control command (a lock release command) for activating the read-controlled memory cell 503 to the lock control section 504. In accordance with the lock release command received, the lock control section 504 activates the read-controlled memory cell 503 to be accessible.

The counter 507 counts the number of times by which the extracted voice feature amount data does not match the voice feature amount data of an individual stored in the readable memory cell 502. When the counted number of times reaches a prescribed value, the microprocessor 508 sends an operation control command (permanent lock command) for permanently locking an arbitrary memory cell in the rewritable non-volatile flash memory 501 to the lock control section 504. The lock control section 504 places the memory cell into a permanently inactive state in accordance with the received permanent lock command. The permanent lock command is known in the art.

Due to such a permanent lock function, the signal processing system 500 provides a higher level of security when incorporated in a mobile electronic device or the like.

A signal processing system according to the present invention includes an A/D conversion section for converting an analog signal input from an external device into a digital signal; a digital signal processing section for processing the digital signal; a D/A conversion section for converting the digital signal processed by the digital signal processing section into an analog signal; and a control section for controlling the A/D conversion section, the digital signal processing section, and the D/A conversion section. The digital signal processing section includes a second program memory area connected, via a first bus, to a first program memory area storing a program for processing the digital signal, and a second data memory area connected to a first data memory area via a second bus. Due to such a structure, the control section controls the elements in the signal processing system so that the first bus is used to transfer the program stored in the first program memory area to the second program memory area, while the second bus is used to write the digital signal processed by the data signal processing section to the first program memory area and/or to read the digital signal stored in the first program memory area. As a result, the real-time signal processing can be realized without increasing the number of elements of the signal processing system.

Utilizing the non-volatility of the first program memory area, an improved level of security can be provided. Especially in the case where data read from memory cells other than a specific memory cell is prevented when the signal processing system is turned on or reset, the signal processing system is not usable by a third party other than the registered individual(s).

In the case where a writable non-volatile memory is used, information downloaded by a communication device, such as a cellular phone, can be written and stored in the first data memory area at a high speed while realizing the high level of security. A voice recognition application can be customized in conformity to the user's preference. Thus, signal processing systems, for example, voice processing systems usable for a variety of applications can be provided.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A signal processing system, comprising:
   an A/D conversion section for converting an analog signal input from an external device into a digital signal;
   a digital signal processing section for processing the digital signal;
   a D/A conversion section for converting the digital signal processed by the digital signal processing section into an analog signal;
   a control section for controlling the A/D conversion section, the digital signal processing section, and the D/A conversion section; and
   a memory section including a first program memory area for storing a program for processing the digital signal and a first data memory area,
   wherein:
   the digital signal processing section includes a second program memory area connected, via a first bus, to the first program memory area, and a second data memory area connected to the first data memory area via a second bus, the control section transfers the program stored in the first program memory area to the second program memory area via the first bus, and executes the program thus stored in the second program memory area, so as to control the processing of the digital signal performed by the digital signal processing section, and the control section stores the digital signal processed by the digital signal processing section in the second data memory area, transfers at least a part of the digital signal stored in the second data memory area to the first data memory area via the second bus, and transfers the digital signal stored in the first data memory area to the second data memory area via the second bus, so as to control the processing of the digital signal performed by the digital signal processing section.

2. A signal processing system according to claim 1, wherein the analog signal input from the external device is a voice signal.

3. A signal processing system according to claim 2, wherein:

the first program memory area further stores data for comparison, the second data memory area is connected to the first program memory area via a third bus, the control section controls the digital signal processing section to read the data for comparison stored in the first program memory area and to compare the digital signal with the data for comparison.

4. A signal processing system according to claim 3, wherein the first program memory area is a rewritable non-volatile memory, and the first data memory area is a high-speed writable memory.

5. A signal processing system according to claim 4, wherein the high-speed writable memory is a volatile memory.

6. A signal processing system according to claim 1, further comprising a third data memory area connected to the first program memory area, wherein the control section stores external information received by a communication device in the third data memory area and transfers the external information stored in the third data memory area to the first program memory area.

7. A signal processing system according to claim 1, wherein:

the first program memory area includes a first non-volatile memory cell unit including at least one non-volatile memory cell, and a second non-volatile memory cell unit including at least one non-volatile memory cell, and the signal processing system further comprises:

a comparison section for comparing the digital signal and data stored in each of the at least one non-volatile memory cell in the first non-volatile memory cell unit, and a lock section for selectively placing the second non-volatile memory cell unit into a state accessible by the control section or a state inaccessible by the control section, wherein:

the first non-volatile memory cell unit is in the state accessible by the control section regardless of a state of the signal processing system, the second non-volatile memory cell unit is in the state inaccessible by the control section when the signal processing system is turned on or reset, and when the digital signal matches the data stored in any of the at least one non-volatile memory cell in the first non-volatile memory cell unit, the control section controls the lock section to change the state inaccessible by the control section of the second non-volatile memory cell unit into the state accessible by the control section.

8. A signal processing system according to claim 7, wherein the data stored in each of the at least one non-volatile memory cell in the first non-volatile memory cell unit is voice feature amount data of an individual.

9. A signal processing system according to claim 8, wherein when the digital signal matches the data stored in any of the at least one non-volatile memory cell in the first non-volatile memory cell unit, the control section controls the lock section to change the state inaccessible by the control section of at least one non-volatile memory cell in the second non-volatile memory cell unit, which corresponds to the non-volatile memory cell in the first non-volatile memory cell unit storing the data matching the digital signal, into the state accessible by the control section.

10. A signal processing system according to claim 7, wherein the first non-volatile memory cell unit includes a one-time programmable memory.

11. A signal processing system according to claim 1, wherein:

the first program memory area includes a first non-volatile memory cell unit including at least one non-volatile memory cell, and a second non-volatile memory cell unit including at least one non-volatile memory cell, and the signal processing system further comprises:

a comparison section for comparing the digital signal and data stored in each of the at least one non-volatile memory cell in the first non-volatile memory cell unit, a lock section for selectively placing each of the first non-volatile memory cell unit and the second non-volatile memory cell unit into a state accessible by the control section or a state inaccessible by the control section, and a counting section for counting a number of times at which the digital signal does not match the data stored in any of the at least one non-volatile memory cell in the first non-volatile memory cell unit, wherein:

the first non-volatile memory cell unit is in the state accessible by the control section when the signal processing system is turned on or reset, the second non-volatile memory cell unit is in the state inaccessible by the control section when the signal processing system is turned on or reset, and when the number of times counted by the counting section reaches a predetermined value, the control section controls the lock section to change the state accessible by the control section of the first non-volatile memory cell unit into the state inaccessible by the control section and to maintain the second non-volatile memory cell unit in the state inaccessible by the control section.

* * * * *